United States Patent [19]

Kitagawa

[11] Patent Number: 4,586,754
[45] Date of Patent: May 6, 1986

[54] LOAD COMPENSATING VALVE WITH CHECK VALVE

[75] Inventor: Yoshihiro Kitagawa, Kyoto, Japan

[73] Assignee: Nippon Air Brake Co., Ltd., Kobe, Japan

[21] Appl. No.: 633,552

[22] Filed: Jul. 23, 1984

[30] Foreign Application Priority Data

Jul. 28, 1983 [JP] Japan .................. 58-118305[U]

[51] Int. Cl.⁴ ............................................. B60T 8/18
[52] U.S. Cl. ..................................... 303/22 R; 303/68
[58] Field of Search ............... 303/22 R, 22 A, 40, 303/28–30, 3, 13, 15, 68–83; 188/195; 137/627.5

[56] References Cited

U.S. PATENT DOCUMENTS 3,413,042 11/1968 Herold ..................... 303/22 AX
3,639,010 2/1972 Mayer ....................... 303/22 A
3,944,287 3/1976 Nagase ........................ 303/15

Primary Examiner—Douglas C. Butler
Attorney, Agent, or Firm—J. B. Sotak

[57] ABSTRACT

A load compensating valve for a compressed air brake system for railroad vehicles having air spring devices. The load compensation valve includes a supply chamber and an output chamber which are interconnected by a supply valve and an exhaust valve. A balance piston responsive to air spring pressure for controlling the pressure in the output chamber. A check valve disposed in parallel with the supply valve to allow the output chamber to discharge when the supply chamber is exhausted.

2 Claims, 5 Drawing Figures

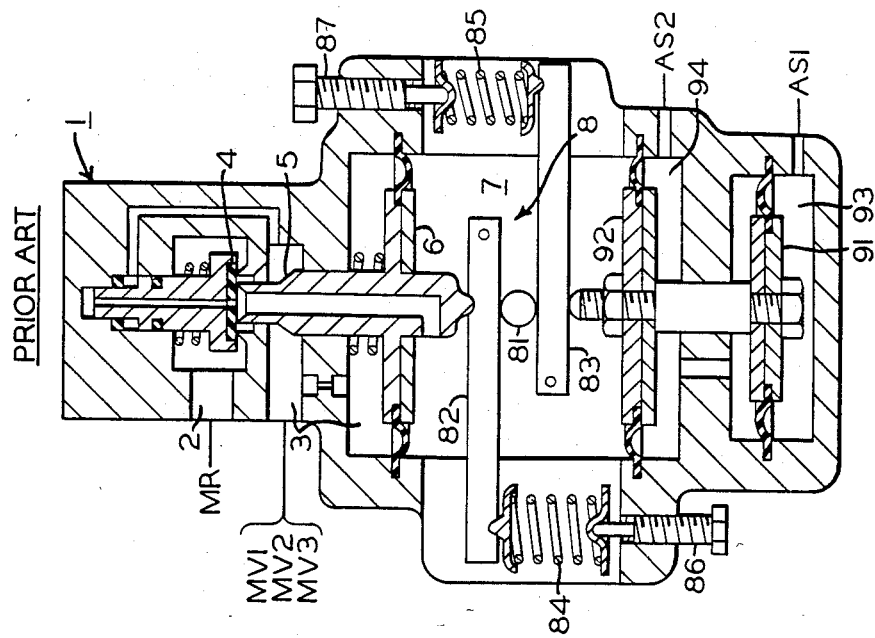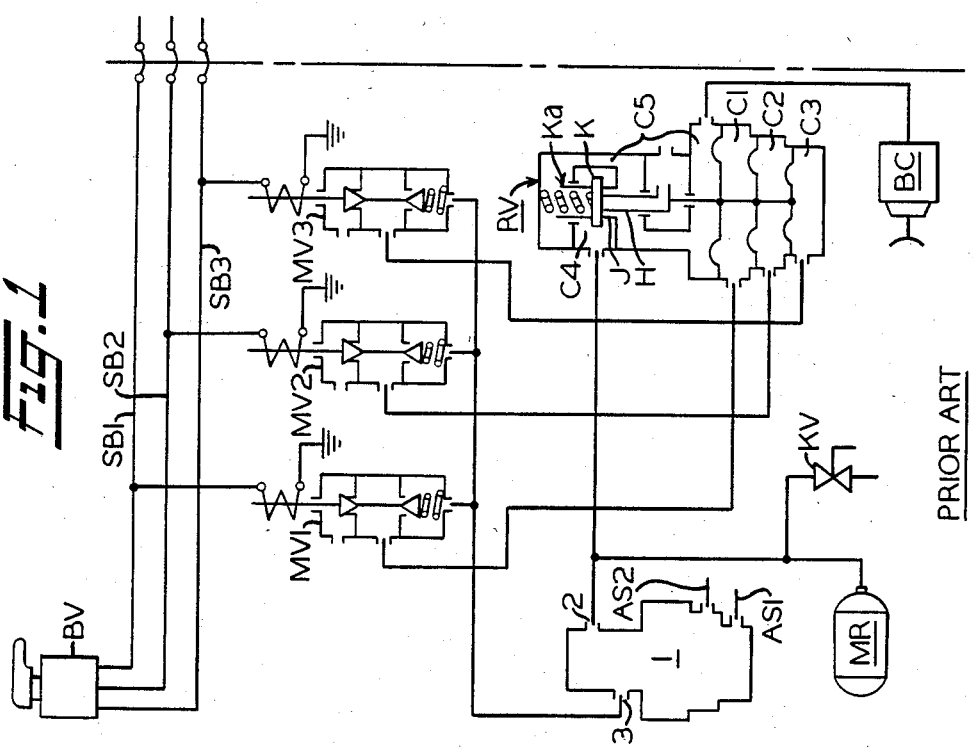

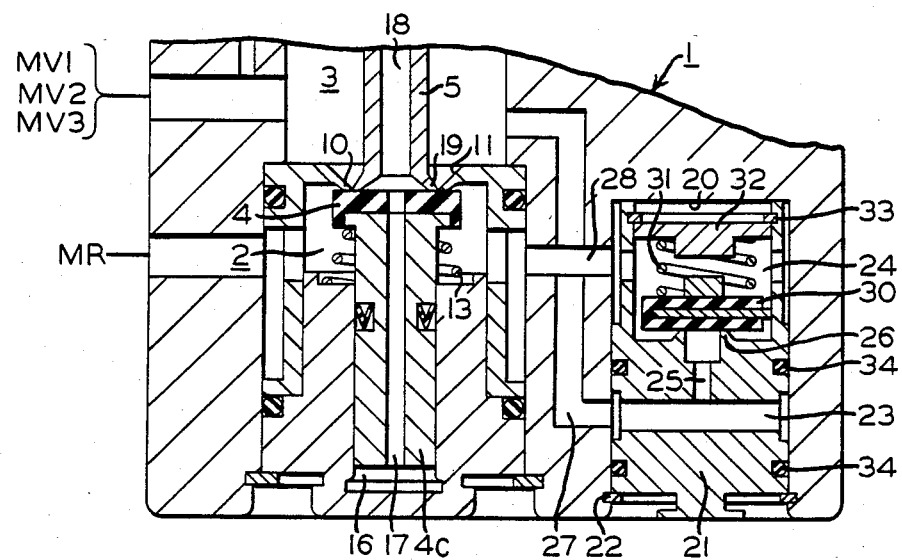

1

LOAD COMPENSATING VALVE WITH CHECK VALVE

FIELD OF THE INVENTION

This invention relates to a load compensating valve for an air brake system and, more particularly, to a vehicle braking system having a load compensating valve having a balance piston responsive to air spring pressure and having supply and exhaust valves for controlling fluid pressure conveyed between a supply chamber and an output chamber and a check valve disposed in parallel with the supply valve which permits the output chamber to be exhausted with the exhaustion of the supply chamber.

BRIEF DESCRIPTION OF THE DRAWINGS

FIG. 1 is a drawing of the relationship between the load compensating valve 1 and the brake device when the brake is in operation.

FIG. 2 is a sectional drawing of the conventional load compensating valve 1.

FIG. 5 is a drawing of an example of the load compensating valve of this current design.

DETAILED DESCRIPTION OF THE INVENTION

Figure 3:
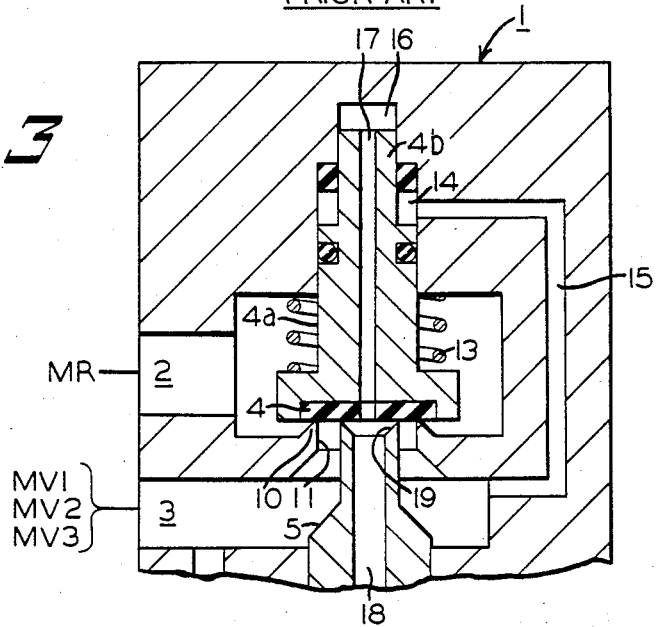
FIG. 3 is an enlarged drawing of the essential parts of the load compensating valve 1 of FIG. 2.

Referring to the drawings and in particular to FIG. 1, there is shown a load compensating valve which supplies fluid pressure such as compressed air to the braking system in proportion to the load sustained by the vehicle such as a railroad car.

In general, the relationship between the load compensating valve and the braking system is shown in FIG. 1. In viewing FIG. 1, the load compensating valve is characterized by numeral 1 and the system includes a brake control mechanism BV, a plurality of electrical train lines SB1, SB2 and SB3, a plurality of electromagnetic valves MV1, MV2 and MV3, a relay valve RV, a brake cylinder BC, and the remaining related elements are braking devices, except for the load compensating valve 1. In addition, a source of the fluid pressure MR supplies the necessary operating force.

The individual electromagnetic valves MV1, MV2 and MV3 are selectively energized and operated by brake commands emanating from the brake control mechanism BV which supplies electrical signals to respective train lines SB1, SB2 and SB3. The supply pressure to the electromagnetic valves is controlled by load compensating valve 1.

The relay valve RV includes a plurality of chambers C1, C2 and C3 defined by a number of flexible diaphragms. These three chambers can provide seven different braking steps to the brake cylinder BC. The seven different combinations of digital bits cause fluid pressure to be supplied to the chambers by electromagnetic valves MV1, MV2 and MV3.

Since there are many reports on the subject, one of which is Tokukaisho 54-110509 report, no further detailed description is believed necessary in regard to the brake system of FIG. 1.

Further, a load compensating valve is shown in the Tokukaisho 52-122775 publication. This conventional load compensating valve is shown in FIGS. 2 and 3 of the present application.

As shown in FIG. 2, the load compensating valve 1 includes a supply chamber 2, an output chamber 3, a supply valve 4, an exhaust valve 5, a balance piston 6, an exhaust chamber 7, an adjustment mechanism 8, a first control piston 91, a second control piston 92, a first control chamber 93, and a second control chamber 94.

The first and second control chambers 93 and 94 are supplied with a separate control pressure AS1 and AS2, respectively, such as air spring pressure which corresponds to the load of the vehicle, such as a railroad car. Thus, the control pressures AS1 and AS2 cause the first and second control pistons 91 and 92 to move up and down as viewed in FIG. 2.

The load or modulating force of the control pressures AS1 and AS2 is transmitted to one side of balance piston 6 through adjustment mechanism 8. The other side of balance piston 6 is contiguous with the output chamber 3. It will be seen that the adjustment mechanism 8 consists of a roller 81 which can be freely adjusted laterally. The levers 82 and 83 are biased by the compression springs 84 and 85 which are tensioned by the adjustment screws 86 and 87.

As shown in FIG. 3, a supply valve seat 10 is formed on the valve body 1 so that it protrudes into supply chamber 2. The chamber 2 is connected to a suitable source of fluid pressure MR. A supply port 11 is formed on the inside of the supply valve seat which is connected to an output chamber 3. The chamber 3 is connected to the electromagnetic valves MV1, MV2 and MV3 of FIG. 1. Further, a supply valve 4 is biased by a supply valve spring 13 which is disposed in supply chamber 2. The supply valve 4 is arranged to open and close the supply hole 11 by the seating and unseating of the supply valve seat 10. A first feedback pressure chamber 14 is disposed behind this supply valve 4 and is connected to output chamber 3 by a feedback passage 15. A second feedback pressure chamber 16 is connected to output chamber 3 by a central passage 17 and to an exhaust hole 18 of exhaust valve 5 as will be described hereinafter.

The exhaust valve 5 is carried by a balance piston 6. As shown, the upper end of valve 5 faces the supply valve 4 and is located in the supply hole 11. The central exhaust hole 18 extends the length of valve 5. An exhaust valve seat 19 is formed at the tip end of exhaust hole 18 and the exhaust hole 18 is opened and closed by seating and unseating the exhaust valve seat 19 by the supply valve 4.

In viewing FIGS. 2 and 3, it will be seen that the exhaust valve seat 19 is closed by the supply valve 4 and the supply valve seat 10 is also closed by the supply valve 4. Thus, the valves 4 and 5 and the seats 10 and 19 form a multiple position valve and in the lapped position the fluid pressure of output chamber 3 has a value proportional to the average value of the control pressures AS1 and AS2.

It will be seen that when control pressures AS1 and AS2 increase, the first and second control pistons 91 and 92 move up, and since this modulating force is transmitted to balance piston 6 through adjustment mechanism 8, the exhaust valve 5 pushes up and unseats the supply valve 4 to open supply hole 11 and assumes a supplying position. Now as the fluid pressure in the output chamber 3 increases due to the fluid pressure supply, the supply valve 4 starts to descend. Thus, when the fluid pressure of output chamber 3 becomes proportional to control pressures AS1 and AS2, then the multiple position valve assumes its lapped position.

Now as control pressures AS1 and AS2 decrease, the exhaust valve 5 descends and the exhaust valve seat 19 is opened by the supply valve 4 so that the fluid pressure in the output chamber 3 is vented through the exhaust hole 18 and its pressure decreases. Now as the fluid pressure in output chamber 3 decreases, the exhaust valve 5 rises, and when the fluid pressure of output chamber 3 becomes proportional to that of control pressures AS1 and AS2, then the lapped position is again resumed.

As explained above, the load compensating valve 1 is used to ensure that the braking power corresponds to the vehicle load. Thus, the conventional load compensating valve 1 as described above is constructed to balance the forces of the fluid pressure acting on supply valve 4 in the lapped position, in order to increase the response character, i. e., sensitivity, for a change in control pressures AS1 and AS2 corresponding to vehicle load, such as air spring pressure. Due to the construction, there is a problem, in that even when the fluid pressure in supply chamber 2 is discharged, the fluid pressure in output chamber 3 is not discharged. A more detailed explanation of this problem will be presented below.

In viewing FIG. 3, the valve is shown in its lapped position. It will be noted that the outer diameter of the first sliding part 4a and the effective diameter of supply valve seat 10 are identical so that the forces of the fluid pressure in supply chamber 2 which push supply valve 4 up and down are balanced. The outer diameter of the second sliding part 4b of supply valve 4, i. e., the inner diameter of the second feedback pressure chamber 16 and the effective diameter of the exhaust valve seat 19 are identical. Thus, the fluid pressure forces in exhaust hole 18 that push the supply valve up and down are balanced. The difference in area between the first sliding part 4a and the second sliding part 4b of the supply valve, i. e., the effective area of the first feedback pressure chamber 14 and the difference of the effective areas of supply valve seat 10 and the exhaust valve seat 19 are identical. Thus, the fluid pressure forces in output chamber 3 that push supply valve 4 up and down are balanced.

Figure 4:
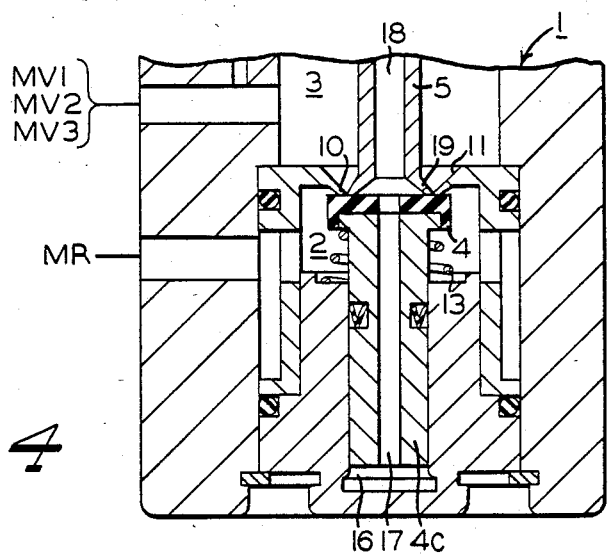
FIG. 4 is a drawing of the essential parts of a different conventional load compensating valve.

Referring now to FIG. 4, there is shown another embodiment of the essential part of the conventional load compensating valve 1. The effective diameter of supply valve seat 10 and the outer diameter of sliding part 4c of the supply valve are approximately the same and the fluid pressure in supply chamber 2 that pushes supply valve 4 up and down are more or less balanced. The effective diameter of exhaust valve seat 19 and the outer diameter of sliding part 4c of supply valve 4, namely, the inner diameter of the second feedback pressure chamber 16, are substantially identical so that the fluid pressure forces in exhaust hole 18 which move the supply valve 4 in the up and down directions are approximately balanced. The differential area between the effective area of supply valve seat 10 and that of exhaust valve seat 19 is relatively small and it is set up so that the fluid pressure force in output chamber 3 that pushes supply valve 4 down is extremely small.

As explained above, the conventional load compensating valve 1 is set up so that the fluid pressure forces that act on supply valve 4 in the lapped position are almost or totally balanced in order to increase the responsiveness, namely, the sensitivity to changes in control pressures AS1 and AS2.

Generally, the load compensating valve 1 of the brake device of a vehicle has to be inspected and adjusted regularly, and at the time of adjustment of the actual vehicle, the fluid pressure in the output chamber 3 has to be drained. Since the fluid pressure force acting on supply valve 4 is balanced as noted above when the fluid pressure in supply chamber 2 is drained by opening the release cock KV, as shown in FIG. 1, there is no force available to break the balance of the supply valve 4, even though the fluid pressure force in the supply chamber 2 on the supply valve 4 is vented to atmosphere. Therefore, the fluid pressure in output chamber 3 is unable to flow in the reverse direction to supply chamber 2. Hence, when it is desired to remove load compensating valve 1 from its mounting, the remaining fluid pressure in output chamber 3 will be released so that a dangerous condition exists. In these cases, when the fluid pressure in supply chamber 2 is drained out but the fluid pressure in output chamber 3 cannot be drained, then the electromagnetic valves MV1, MV2 and MV3 are opened and closed by a repeated operation of the brake and the manipulation or operation of the brake control device BV, as shown in FIG. 1. The pressure in output chamber 3 is drained to membrane board chambers C1, C2 and C3 through the relay valve RV. Generally, a railroad train consists of many vehicles and the inspection and adjustment has to be done one car at a time when the train is stopped by applying the brake. Therefore, the above brake operation has to be repeated from the front or rear vehicle for each vehicle and it takes a great deal of time and effort for this inspection and adjustment.

Also, in the lapped position, the relay valve RV of the brake system shown in FIG. 1 and particularly the fluid pressure force in supply chamber C4 that acts on the supply valve K is balanced since the effective diameter of the supply valve seat J and the outer diameter of the sliding part K of the supply valve K are substantially identical, and therefore it is not directly acting as a pressurizing force against the supply valve K. If the electromagnetic valves MV1, MV2 and MV3 or the brake controller BV malfunction and the brake is not released so that braking action is occurring, the fluid pressure of output chamber 3 of load compensating valve 1 is being supplied to the diaphragm chambers C1, C2 and C3 of the relay valve RV through the electromagnetic valves MV1, MV2 and MV3 and the relay valve RV is in the lapped position, the fluid pressure of output chamber 3 of load compensating valve 1 is not discharged from the release cock KV even when the cock KV is opened. The fluid pressure in the diaphragm chambers C1, C2 and C3 of the relay valve RV remain in position and the exhaust valve H does not descend. Also at this time, the fluid pressure in the output chamber C5 does not flow back to the supply chamber C4 since the supply valve K in the relay valve RV does not open, and as a result the brake cylinder BC cannot be released.

As solutions to these problems inherent in a conventional designed system, a method of installing an exhaust cock at the output side tubing of load compensating valve 1 or a way of eliminating the balance of force due to the fluid pressure that acts on supply valve 4 of load compensating valve 1 have been considered. However, the former solution, namely, to install the vent cock in the already limited space in the existing vehicles, and at a location which is easy to operate is structurally very difficult. The latter solution lowers the responsiveness or sensitivity to the control pressures, AS1 and AS2, which corresponds to the load of the vehicle, such as, air spring pressure, and therefore lowers the reliability of the brake in reducing the speed and stopping the vehicle.

Therefore, the technical solution of this invention is to exhaust the fluid pressure in supply chamber 2 so that the fluid pressure in output chamber 3 will flow in the reverse direction into supply chamber 2 in the load compensating valve 1 without destroying the balance of fluid pressure forces acting on supply valve 4 and without lowering the reliability of the brake or resulting in any difficulty during installation.

It is technically possible to solve this problem while using the conventional load compensating valve of the type described above wherein the supply chamber 2 and the output chamber 3 are interconnected by a check valve that is normally biased to a closed position and is opened when the supply chamber 2 is exhausted to allow fluid pressure to flow from the output chamber 3 to the supply chamber 2.

One embodiment of this invention having a load compensating valve 1 is explained in detail with reference to FIG. 5. Many of the illustrated components are identical to those described in FIG. 4 and therefore no detailed explanations are given thereof. The additional parts and structure are given different numbers in FIG. 5 and other parts are assigned the same characters as in FIGS. 1-4.

In viewing FIG. 5, it will be seen that a mounting hole 20 is formed on the right side of the main body of supply valve 4. The mounting body of a check valve 21 is inserted into mounting hole 20 and is fixed in place by a retaining ring 22. A first chamber 23 and a second chamber 24 are formed on the inside of the mounting body for check valve 21 and these two chambers 23 and 24 are interconnectable by a central hole or passageway 25. A check valve seat 26 is formed around the upper end of the hole 25 on the lower wall of the second chamber 24. The first chamber 23 is connected to output chamber 3 by the first passage 27, and the second chamber 24 is connected to supply chamber 2 by the second passage 28. A check valve 30 is placed in the second chamber 24 and this check valve 30 is biased downwardly by check valve compression spring 31. The top end of check valve spring 31 engages a spring seat 32. The spring seat 32 is confined by a retaining ring 33 which is disposed in the upper body member 21. A pair of rubber O-rings are disposed in annular grooves formed in the valve body 21 for sealing the respective chambers.

FIG. 5 shows the multiple position, and fluid pressure of output chamber 3 is supplied to the first chamber 23 while fluid pressure from the supply chamber 2 is supplied to the second chamber 24. The check valve 30 is seated against the check valve seat 26 by the compressive force of check valve spring 31 and by the differential pressure force existing between the second chamber 24 and the first chamber 23 which is multiplied by the effective area of check valve seat 26. Thus, the passageway 25 is normally closed and there is no communication path between chambers 23 and 24.

Now if the fluid pressure in supply chamber 2 is vented to atmosphere by opening the release cock KV, shown in FIG. 1, the fluid pressure in the second chamber 24 also drops through passageway 28. This causes a differential pressure to occur between the first and second chambers 23 and 24 which, in turn, overcomes the downward biasing force by the compression spring 31. Thus, the valve member 30 is unseated from check valve seat 26 which results in the opening of the passage hole 25. The fluid pressure in output chamber 3 is discharged through a path established by the first passage 27, the first chamber 23, the passageway 25, the second chamber 24, and the second passage 28 to the vented supply chamber 2. This reverse flow of fluid pressure from output chamber 3 causes the fluid pressure in output chamber 3 to decrease so that the force which pushes balance piston 6 downwardly also decreases. Therefore, in viewing FIG. 5, the exhaust valve 5 descends to the open position wherein the supply valve 4 is unseated while the exhaust valve 5 is still seated against the supply valve 4. The fluid pressure in output chamber 3 is then also discharged from supply hole 11 in the reverse direction.

While the check valve 30 has been added to the conventional load compensating valve 1 shown in FIG. 4, the result would be the same if check valve 30 were added to the compensating valve shown in FIG. 3.

As is readily evident from the above explanation, the load compensating valve 1 of this invention uniquely adds a check valve 30 in parallel with the supply valve 4 which results in the following beneficial effects.

First, during the periodic inspection and adjustment of actual vehicles, the adjustments can be done without repeating the braking and releasing operations of the brake controller BV from the first or last vehicle for each vehicle to be tested and thus, time and labor can be reduced significantly.

Second, since the fluid pressure in the output chamber 3 can be exhausted together with the fluid pressure of supply chamber 2, there is no trapped fluid pressure to jet out like in the conventional brake system when it is necessary to replace the load compensating valve 1 and therefore, the replacement is safer.

Third, when the brake is not releasing by not returning to the exhaust position from the supply position due to a malfunction of electromagnetic valves MV1, MV2 and MV3 or brake controller BV, the fluid pressure in diaphragm chambers C1, C2 and C3 of the relay valve RV can be discharged from the electromagnetic valves MV1, MV2 and MV3, output chamber 3, and supply chamber 2 of the load compensating valve 1 of this invention, and the brake cylinder BC can be released by an exhaust action of the relay valve RV. Therefore, this can be fully applied to a vehicle that does not have a release cock in the line of brake cylinder BC.

Fourth, the sensitivity of the load compensating valve 1 remains unchanged from the conventional model and furthermore, the conventional relay valve RV can be used as is as explained above.

Having thus described my invention, what I claim as new and desire to secure by Letters Patent, is:

1. A vehicle load compensating valve comprising, a balance piston, one side of said balance piston responsive to a modulating force based on control pressure corresponding to the load of the vehicle, an output chamber formed on the other side of said balance piston, a supply chamber connected to a source of fluid pressure, a supply valve seat located in said supply chamber, a supply valve mounted in said supply chamber which opens and closes a supply passage disposed between said output chamber and said supply chamber, an exhaust valve carried to said balance piston, an exhaust valve seat which is opened by said exhaust valve to vent said output chamber, and when said supply valve is seated on said supply valve seat and said exhaust valve is seated on said supply valve the fluid pressure forces are balanced, and a check valve is disposed in parallel with said supply valve to cause said output chamber to be exhausted when said supply chamber is exhausted, said check valve includes a mounting body inserted and retained in a mounting hole to form a first and second chamber which are interconnected by a central passageway in which a check valve seat is formed around the upper end of said passageway and said check valve is situated in said second chamber and is spring-biased against said check valve seat to normally close off communication between said first and second chambers and when the fluid pressure in said supply chamber is vented to atmosphere a differential pressure occurs between said first and second chambers to overcome the spring-biasing to unseat said check valve to allow communication between said first and second chambers.

2. The vehicle load compensating valve, as defined in claim 1, wherein said control pressure is derived from air spring pressure sources and said fluid pressure is compressed air.

* * * * *